(12) United States Patent
Petsko et al.

(10) Patent No.: US 6,292,516 B1
(45) Date of Patent: *Sep. 18, 2001

(54) COMMUNICATION SYSTEM USING PACKETS STUFFED WITH TEST WORDS FOR EVALUATING DATA RECEPTION CHARACTERISTICS WHILE PROVIDING INCREASED DATA THROUGHPUT

(75) Inventors: David P. Petsko, Akron; Michael S. Dollard, Independence, both of OH (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,254

(22) Filed: Feb. 13, 1997

(51) Int. Cl.⁷ ...................................................... H04L 1/02
(52) U.S. Cl. .......................... 375/267; 375/260; 375/347; 455/33.3; 455/277.2
(58) Field of Search .................................. 375/260, 267, 375/206, 200, 202, 224, 347; 455/562, 277.1, 78, 277.2; 370/329, 208; 360/13

(56) References Cited

U.S. PATENT DOCUMENTS

| | | | | |
|---|---|---|---|---|
| 4,327,382 | * | 4/1982 | Tanaka | 360/13 |
| 5,369,801 | * | 11/1994 | Smith | 455/277.1 |
| 5,446,922 | * | 8/1995 | Siwiak et al. | 455/277.2 |
| 5,628,052 | * | 5/1997 | DeSantis et al. | 455/562 |
| 5,748,676 | * | 5/1998 | Mahany | 375/260 |

* cited by examiner

*Primary Examiner*—Stephen Chin
*Assistant Examiner*—Shu Wang Liu
(74) *Attorney, Agent, or Firm*—Arter & Hadden LLP (57) ABSTRACT

A method for communicating a packet of digital information including at least a preamble with a synchronization pattern, and a data field. The method includes the steps of including at least a plurality of test words at different respective locations in the data field; transmitting the packet as a whole including the test words from a transmitting device to a receiving device; receiving the packet with the receiving device; evaluating each of the plurality of test words in the received packet based on a comparison with a predefined criteria; and analyzing data reception properties associated with receiving the packet based on the evaluating step.

43 Claims, 7 Drawing Sheets

COMMUNICATION SYSTEM USING PACKETS STUFFED WITH TEST WORDS FOR EVALUATING DATA RECEPTION CHARACTERISTICS WHILE PROVIDING INCREASED DATA THROUGHPUT

TECHNICAL FIELD

The present invention relates generally to a method and apparatus for communicating digital information packets, and more particularly to a method and apparatus for communicating packets with reduced errors while providing increased data throughput.

BACKGROUND OF THE INVENTION

In any wireless communication network there is a continued effort to achieve higher data exchange rates. Typically, digital data is exchanged wirelessly in the form of packets between two devices communicating with each other. Such packets are also commonly referred to as frames and represent a sequence of bits making up the digital information.

Figure 1:
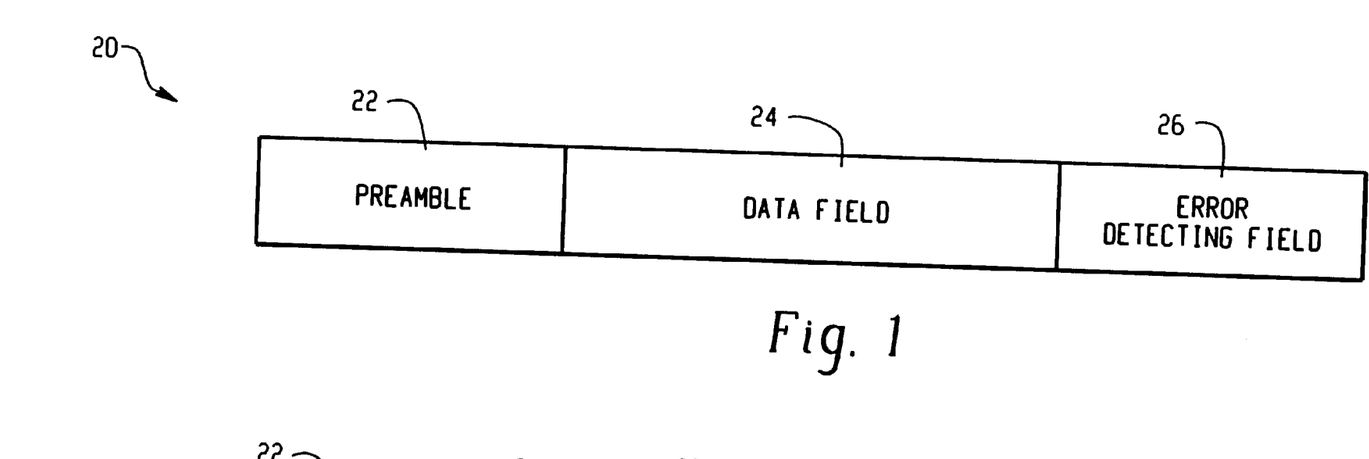
FIG. 1 is a block diagram representing a conventional packet format.

Referring briefly to FIG. 1, a packet 20 typically includes a preamble 22, a data field 24 and an error detecting field 26. The preamble 22 includes a synchronization pattern (not shown) which allows a device receiving the packet 20 effectively to lock-on to the packet 20. The preamble 22 also typically includes a number of other control fields (not shown) which include such information as the source address, destination address, etc., of the packet 20. The data field 24 includes the particular digital information intended to be communicated, sometimes referred to as the "payload". The error detecting field 26 is normally located at the end of the packet as a means for checking the accuracy of a given transmission. For example, a cyclical redundancy code (CRC) value is commonly included in the error detecting field 26.

A maximum length of a packet is determined primarily based on system tolerances for acceptable data bit error rate (BER) or frame error rate (FER) for transmissions between two devices. The longer in length the packet or frame, the more likelihood there will be an error which would require the packet to be re-transmitted.

A receiving device attempting to receive a frame or packet must determine whether the current signal-to-noise ration (S/N ratio) associated with a particular receiving antenna is sufficiently strong to receive the packet being transmitted. In receivers having two or more antennas which allow for antenna diversity, the S/N ratio associated with different antennas may differ thereby allowing the packet to be received by one antenna and not the other. The selection of which of several antennas to use while receiving a packet is conventionally done once at the start of reception of a packet. The selected antenna is then used to receive the remainder of the packet regardless of whether conditions change in the system which would otherwise have made one of the other antennas a better candidate for receiving at least a portion of the remainder of the packet.

Figure 2:
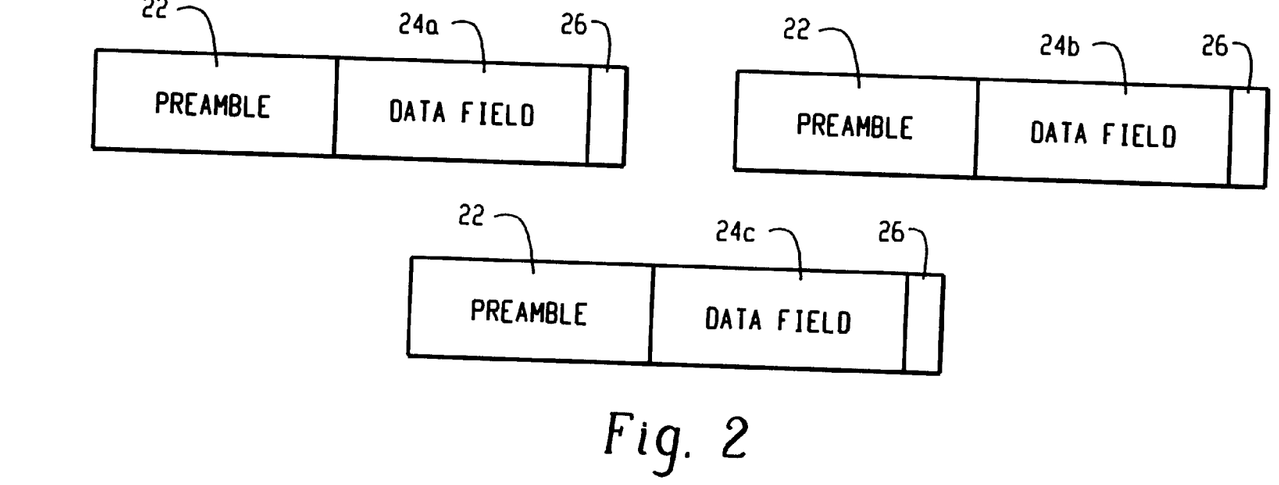
FIG. 2 is a block diagram representing a conventional format for a divided packet including a plurality of smaller length packets.

In order to avoid having frame errors which would require the re-transmission of an entire packet, data in packets are often divided into several smaller packets having shorter lengths. For example, FIG. 2 illustrates the manner in which the data field 24 of the packet 20 in FIG. 1 can be divided into n (e.g., n=3) smaller packets. Each smaller packet includes a corresponding portion (e.g., 24a–24c) of the original data field 24. The smaller length packets are then transmitted separately together with a corresponding preamble 22 and its own error detecting field 26 as represented in FIG. 2.

By having smaller packet lengths, overhead associated with re-transmitting a single, long length packet may be reduced. Overhead associated with re-transmitting a packet may, for example, include the time it takes the receiving device to transmit a negative-acknowledgment indicating improper reception, time in generating another identical packet for transmission, and any additional time associated with waiting for the air to clear before re-transmitting the packet. By initially dividing data up into several packets having shorter lengths, time associated with transmitting and receiving the negative-acknowledgment can at least be avoided.

Unfortunately, even with dividing data up into several smaller packets, much of the overhead discussed can still exist. For instance, in order to send two consecutive packets which are relatively short in length the transmitting device must wait for an acknowledgment associated with transmission of a first packet before attempting to transmit a second packet. Additionally, even after receiving the acknowledgment, the transmitting device must still wait for the air to clear before transmission can begin for the second packet. Further, for each additional packet that is transmitted, there is extra overhead associated with including the preamble field and the detecting field.

In view of the aforementioned shortcomings associated with conventional data transmission, there is a strong need in the art for an improved method and apparatus which allows for reduced overhead associated with transmitting data. In particular, there is a strong need in the art for an apparatus and method which does not sacrifice data throughput.

SUMMARY OF THE INVENTION

According to one particular aspect of the invention, a method is provided for communicating a packet of digital information including at least a preamble with a synchronization pattern and a data field. The method includes the steps of including at least a plurality of test words at different respective locations in the data field; transmitting the packet as a whole including the test words from a transmitting device to a receiving device; receiving the packet with the receiving device; evaluating each of the plurality of test words in the received packet based on a comparison with a predefined criteria; and analyzing data reception properties associated with receiving the packet based on the evaluating step.

According to another aspect of the invention, a system is provided for communicating a packet of digital information including at least a preamble with a synchronization pattern, and a data field. The system includes means for including at least a plurality of test words at different respective locations in the data field; means for transmitting the packet as a whole including the test words from a transmitting device to a receiving device; means for receiving the packet with the receiving device; means for evaluating each of the plurality of test words in the received packet based on a comparison with a predefined criteria; and means for analyzing data reception properties associated with receiving the packet based on the evaluation performed by the means for evaluating.

In accordance with yet another aspect of the invention, a system is provided for communicating a packet of digital information including at least a preamble with a synchronization pattern and a data field. The system includes a transmitting device for transmitting the packet via a radio frequency (RF) signal, the transmitting device including:

means for dividing the packet into a plurality of fragments and including test words in between consecutive fragments; and a transmitter for transmitting the packet as a whole including the test words via the RF signal; and a receiving device for receiving the packet from the transmitting device, the receiving device including: a receiver for receiving the packet via the RF signal; a plurality of antennas; a switch for determining which of the plurality of antennas provides the RF signal to an input of the receiver; a control circuit operatively connected to the switch for causing each of the plurality of antennas to be used in receiving at least a corresponding portion of each test word; an evaluation circuit for evaluating reception quality of the receiver using each of the plurality of antennas based on receiving the corresponding portion of each test word; and a selection circuit, governed by the evaluation circuit, for selecting one of the plurality of antennas to provide the RF signal to the input of the receiver during a portion of the packet subsequent to each test word.

According to still another aspect of the invention, a method is provided for communicating a packet of information in a wireless communication system. The method includes the steps of inserting a test word in a data field of the packet to be transmitted wirelessly, the test word defining a boundary between a first fragment of data in the data field and a second fragment of data in the data field; transmitting the packet from a transmitting device; receiving the packet with a receiving device having a plurality of antennas; evaluating, during receipt of the packet, the test word in the data field of the packet; selecting, based on the evaluation, one of the plurality of antennas; and utilizing, during receipt of at least the second fragment of data, the selected antenna of the plurality of antennas.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals refer to like elements throughout.

According to the present invention, when transmitting a packet it is possible to obtain the benefits of both packet fragmentation and antenna diversity without substantially sacrificing overall data throughput. As is described in more detail below, the present invention involves dividing a packet into a plurality of fragments. Unlike the prior art, however, the fragments are not transmitted separately as part of smaller length packets. Instead, the present invention involves including test words within the packet. The test words are interposed between adjacent fragments of data. The packet, including the test words, is then transmitted as a whole (i.e., not in separate fragments) from a transmitting device to a receiving device. During the receipt of each test word, the receiving device performs an antenna diversity check to determine which antenna is best suited to receive the fragment following the test word within the packet. The receiving device then selects the best antenna and receives the incoming fragment using the selected antenna prior to performing another antenna diversity check upon receiving the next test word.

In this manner, the invention attempts to optimize its ability to receive the incoming packet with a minimum number of errors. In the preferred embodiment, the invention can evaluate and adjust its reception capabilities "on-the-fly" in order to reduce the likelihood of an error in reception.

It is not necessary for each packet fragment to be transmitted in separate packets as in the prior art. The present invention does not require that a lengthy preamble be included with each fragment. Instead, test words having substantially shorter length can be utilized since the packet is transmitted as a whole. A preamble with routing information and synchronizing bits is not necessary prior to each fragment since synchronization only needs to occur once at the beginning of the packet. The test words need only be long enough to provide an indication of the reception quality of each antenna. Accordingly, the overall data throughput associated with transmitting each packet is substantially greater than that which has been achieved in the approach shown in FIGS. 1 and 2.

Figure 3:
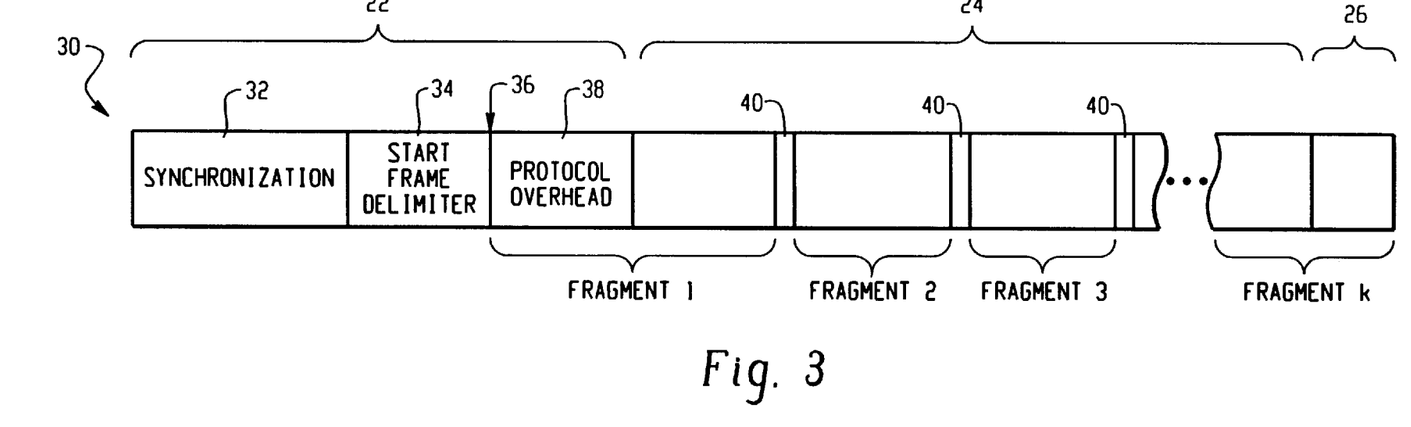
FIG. 3 is a block diagram representing a packet format including test words in accordance with the present invention.

Referring to FIG. 3, an exemplary format is shown for a digital information packet 30 in accordance with the present invention. As shown in FIG. 3, the packet 30 includes a preamble 22, a data field 24, and an error detecting field 26 similar to the packet 20 in FIG. 1. The preamble 22 includes a synchronization field 32 containing a string of bits which allows a receiving device to lock-on to the packet 30 as is conventional. Following the synchronization field 32, the preamble 22 includes a start frame delimiter field 34 which contains a delimiter for indicating the synchronized start of the packet 30 immediately following the delimiter field 34 as identified at 36. Beginning at 36, the preamble 22 includes a protocol overhead field 38 which contains such information as the source address of the packet 30, the destination address, packet type information, etc., as is conventional.

The data field 24 includes the particular information which is intended to be communicated in the packet as noted above. The error detecting field 26 includes a CRC value for the packet data, for example. As shown in FIG. 3, the packet 30 is divided nominally into k consecutive fragments. Included between each pair of fragments is a test word 40. Preferably the fragments are of equal length such as 1200 bits (or symbols) each, for example. The test words 40, on the other hand, are substantially shorter in length, e.g., 16 or 32 bits (or symbols) each. Most of the fragments and intervening test words 40 are found within the data field 24. This is because the data field 24 ordinarily is substantially longer in length than the other portions of the packet 30. Nevertheless, the preamble 22 and/or the error detecting field 26 may also be fragmented. It is preferred, however, that the synchronization field 32 and start frame delimiter field 34 remain intact prior to a first fragment so as to allow a receiving device to lock-on to the packet quickly and reliably.

In the exemplary embodiment shown in FIG. 3, fragment 1 of the packet follows the start frame delimiter field 34 and includes the protocol overhead field 38 and a portion of the data field 24. The kth fragment includes the tail end of the data field 24 together with the error detecting field 26. The remaining fragments 2 through k-1 are located in the data field 24.

Figure 4:
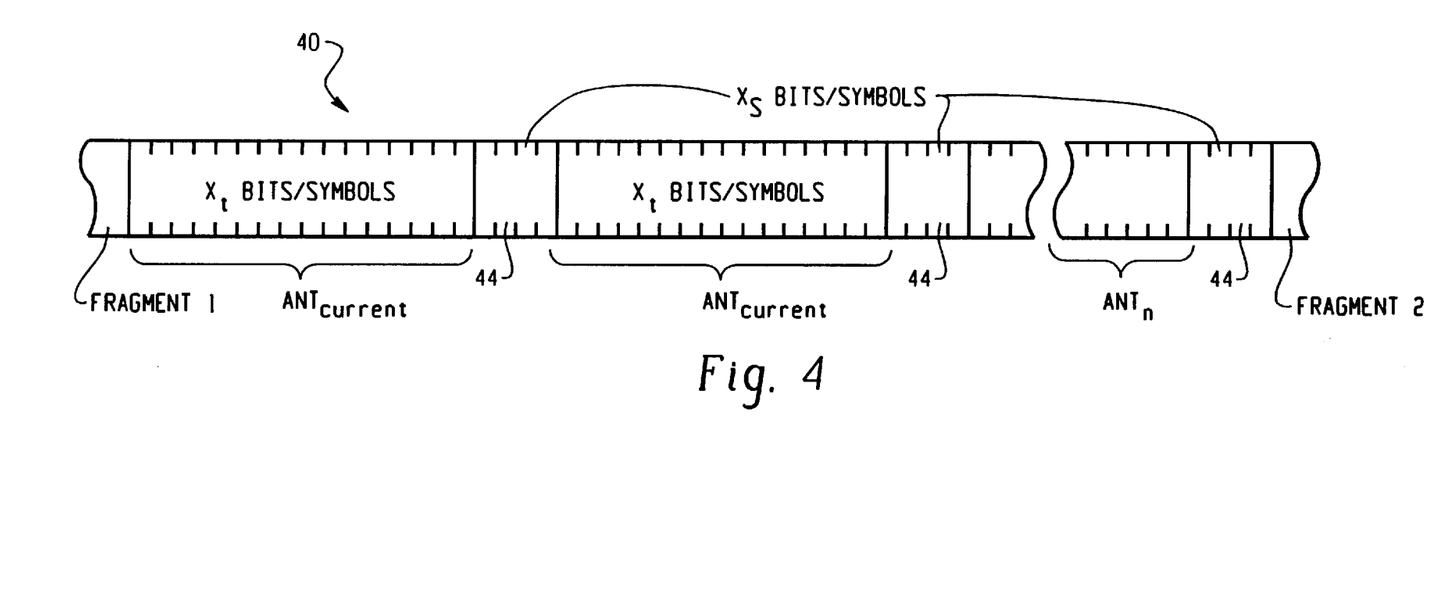
FIG. 4 is an exploded view of a test word in accordance with the present invention.

Turning now to FIG. 4, an expanded view of a given test word 40 is shown. Each test word 40 is divided into n different ANT fields. Each ANT field includes a predefined test pattern of bits (or symbols) which is received by the receiving device using a different respective diversity antenna. The value of n is equal to the number of diversity antennas which are available to a device receiving the packet 30. As is discussed below in connection with FIGS. 6, 7 and 9, the receiving device evaluates which particular diversity antenna receives its test pattern in the corresponding ANT field with the highest accuracy. The receiving device then selects the antenna exhibiting the best accuracy as the antenna for receiving the fragment of the packet immediately following the test word 40.

The first ANT field in each test word 40 preferably immediately follows the preceding packet fragment. In the preferred embodiment, the first ANT field ($ANT_{current}$) corresponds to the antenna in the receiving device which had been utilized most recently (i.e., was utilized to receive the immediately preceding packet fragment). Immediately following the $ANT_{current}$ field is an optional switching field 44. The switching field 44 is included to provide adequate time for the receiving device to switch from the current antenna to a next available diversity antenna in order to receive the predefined test pattern included in the next ANT field (i.e., $ANT_{current+1}$). In between the $ANT_{current+1}$ field and the next $ANT_{current+2}$ field is another switching field 44. This sequence is then repeated for each of the n different antennas where each ANT field is $X_t$ bits (or symbols) long and each switching field 44 is $X_s$ bits (or symbols) long. Following the last antenna field $ANT_n$, there is a final switching field 44 during the receipt of which the receiving device switches to the diversity antenna exhibiting the highest reception quality. The receiving device then proceeds to receive the next fragment within the packet using the selected antenna.

The total length of each test word 40 depends, of course, on the length of each test pattern included in the respective ANT fields, the length of each switching field 44, and the number of diversity antennas available to the receiving device. Each ANT field may consist, for example, of a 16-bit (or symbol) test pattern. The length of each switching field 44 need only be as long as it takes the receiving device to switch from one diversity antenna to another. Typically, such switching can occur within 1 to 2 microseconds. Accordingly, each switching field 44 can be 1 to 2 bits (or symbols) in length based on a 1 megabit (symbol) per second data transmission rate. Thus, each test word 40 is substantially shorter in length than a preamble with synchronizing bits and other source/destination information included with each separately transmitted fragment as was conventional.

Figure 5:
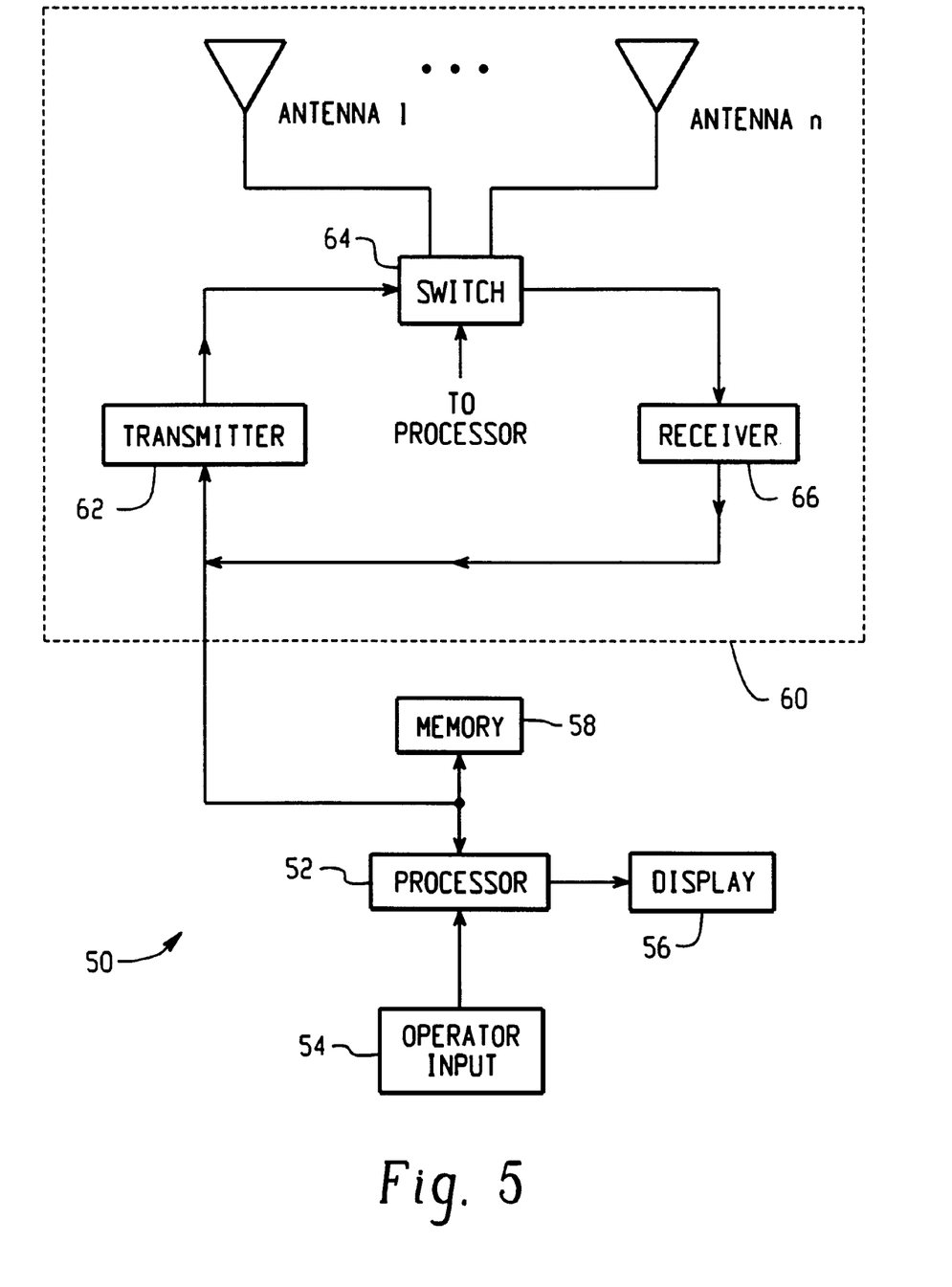
FIG. 5 is a block diagram of a transmitting device (or receiving device) in accordance with the present invention.

Referring now to FIG. 5, shown is a block diagram of a radio 50 suitable for carrying out the present invention. The radio 50 may be a transmitting device which transmits packets 30 in accordance with the format discussed above. In addition, or in the alternative, the radio 50 may be a receiving device for receiving the packets 30 in accordance with the invention. The radio 50 includes a processor 52 which can be programmed to control and to operate the various components within the radio in order to carry out the various functions described herein. The processor 52 is coupled to an operator input device 54 which allows an operator to input data to be communicated to a receiving device such as another radio 50. Alternatively, the receiving device may be a base station in a wireless network, for example. The radio 50 itself may be a mobile terminal used in a wireless network or part of a base station connected to a system backbone.

The input device 54 can include such items as a keypad, touch sensitive display, bar code scanner, microphone, etc. A display 56 is also connected to and controlled by the processor 52. The display 56 serves as a means for displaying information stored within the radio 50 and/or received from another radio. The display 56 can be a flat panel liquid crystal display with alphanumeric capabilities, for example, or any other type of display as will be appreciated.

A memory 58 is included in each radio 50 for storing program code run by the processor 52 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 58 also serves as a storage medium for storing digital information which is received by the radio 50 or which is to be transmitted by the radio 50 in the above-described packets 30.

The radio 50 includes an RF section 60 connected to the processor 52. The RF section 60 includes a transmitter 62 which is controlled by the processor 52 and modulates an RF signal using spread spectrum techniques, for example, in order to transmit information packets 30 to a receiving device. The output of the transmitter 62 is connected to the transmit input of an antenna switch 64. The radio 50 also includes n different antennas (ANT1 through ANTn) which are used in an antenna diversity scheme for transmitting and receiving signals. The antenna switch 64 determines which particular antenna ANT1 through ANTn is used to transmit and/or receive signals at any given time. The control input of the switch 64 is coupled to the processor 52 which controls which particular antenna is being used to transmit or receive at any given time. Preferably the switch 64 is capable of relatively high speed switching between one antenna and another. For example, switching speeds on the order of 1 or 2 microseconds or less is preferred.

The receive terminal of the antenna switch 64 is connected to an RF receiver 66 also included in the RF section 60. Thus, the position of the switch 64 determines which particular antenna ANT1 through ANTn is used to receive signals which are then input to the RF receiver 66. The RF receiver 66 receives RF transmissions from a transmitting device such as another radio 50 via the selected antenna 48 and demodulates the signal to obtain the digital information packet 30 modulated thereon.

In the event the radio 50 is to transmit information to a receiving device in response to an operator input at input 54, for example, the processor 52 forms within the memory 58 an information packet 30. As is described more fully below in connection with FIGS. 6, 7 and 9, the packet 30 is formed so as to include the above mentioned preamble 22, data field 24 and error detecting field 26 (optional). Included within the packet 30 are the aforementioned test words 40 during which the receiving device evaluates the reception quality of each of its diversity antennas. The information packet 30 is then delivered from the memory 58 to the RF transmitter 62 which modulates the packet 30 onto an RF signal, again using spread spectrum techniques, for example, and transmits the RF signal to a receiving device via the antenna ANT1 through ANTn selected by the processor 52.

Conversely, information packets 30 which are transmitted to the radio 50 are received by way of the antenna(s) ANT1 through ANTn selected by the processor 52 based on use of the test words 40 included in the packets 30. The RF receiver 66 demodulates the received signal in order to extract the digital information packet which is then processed and stored by the processor 52 as described more fully below.

Figure 6:
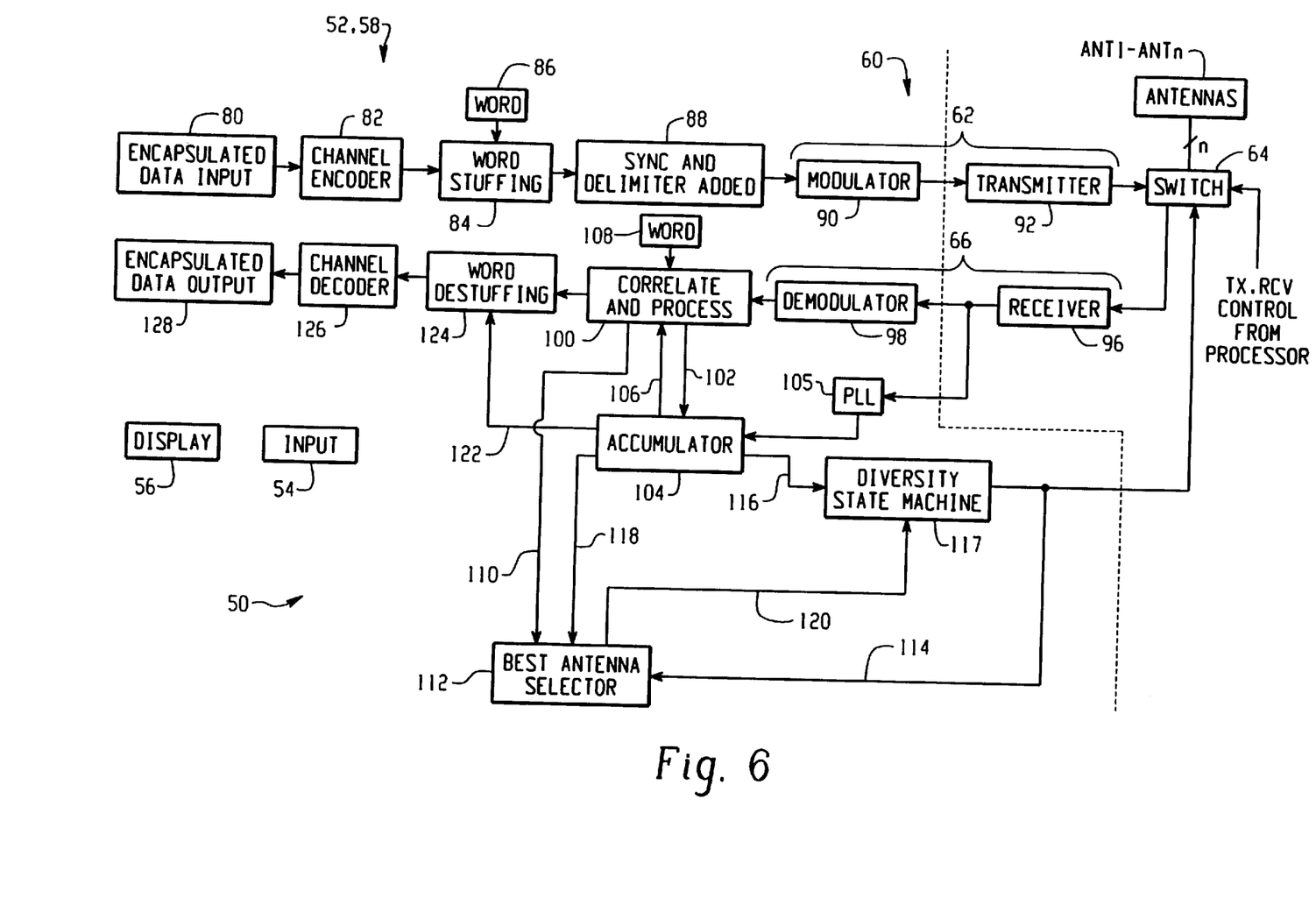
FIG. 6 is an operation level block diagram of a transmitting device (or receiving device) in accordance with a first embodiment of the present invention.
Figure 7:
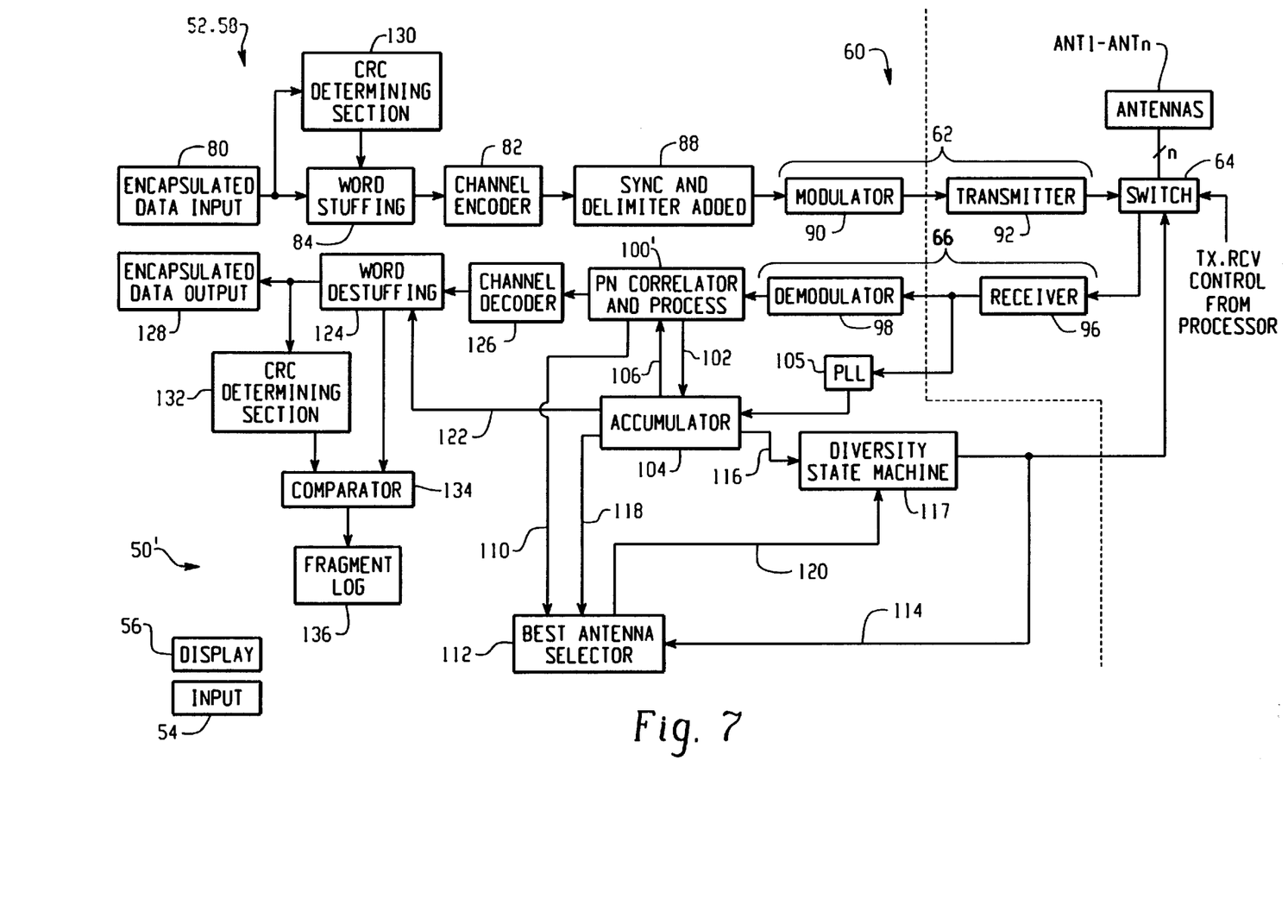
FIG. 7 is an operation level block diagram of a transmitting device (or receiving device) in accordance with a second embodiment of the present invention.
Figure 9:
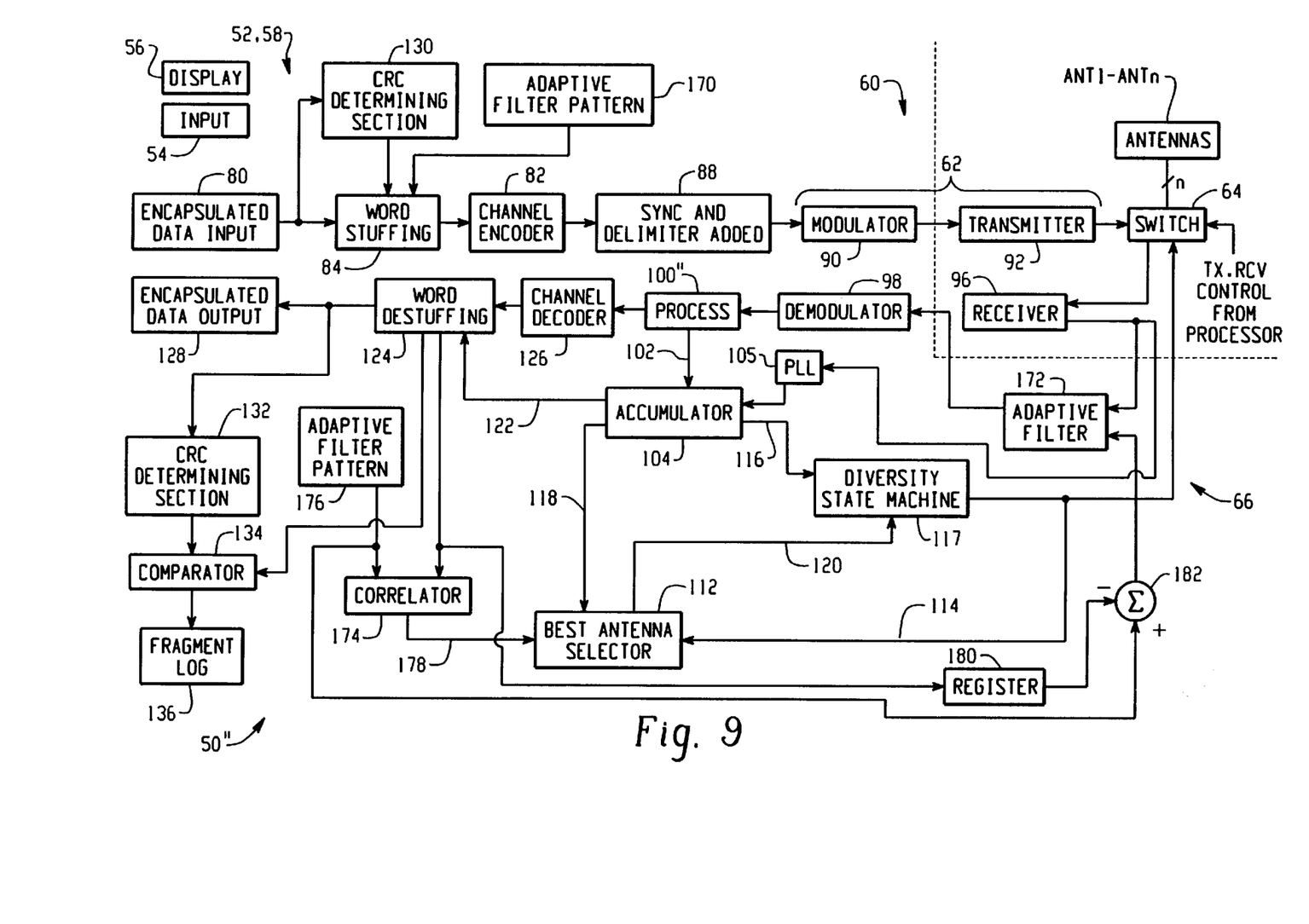
FIG. 9 is an operation level block diagram of a transmitting device (or receiving device) in accordance with a third embodiment of the present invention.

Referring now to FIG. 6, a first embodiment of the radio 50 is shown in detail. As with FIGS. 7 and 9, FIG. 6 represents the radio 50 in block diagram form with many of the blocks representing functions rather than individual components. It will be appreciated that the various operations to the left of the dashed vertical line will be carried out primarily by the processor 52 and memory 58, although dedicated components could certainly be used without departing from the scope of the invention. The operations shown to the right of the dashed vertical line are carried out primarily by the RF section 60. The packets 30 which are received and transmitted are processed substantially in real time such that each packet 30 can be viewed as a sequence of data which is processed sequentially in time by the various functions and/or components.

During operation, block 80 in FIG. 6 represents digital data which has been previously input via the input 54 or the like and which is to be transmitted to a receiving device. Specifically, block 80 outputs the digital data (or "payload") to be included in the data field 24 of a given packet 30 which is to be transmitted. In addition, the block 80 provides the protocol overhead data (field 38 in FIG. 3) including any routing information. The block 80 outputs the data to a channel encoder 82 which encodes the data according to a predefined data encoding criteria utilized by the radio 50. In the exemplary embodiment, the channel encoder 82 performs a data-to-symbol conversion on the data from block 80 as part of a quadrature amplitude modulation scheme (e.g., QPSK, 8-QAM, 16-QAM, etc.). However, it will be appreciated that data-to-symbol conversion is by no means necessary for carrying out the present invention.

The channel encoder 82 provides the protocol overhead and data field data (in symbol form) to block 84 where the test words 40 are inserted (or "stuffed") at predetermined intervals. In the present embodiment, the protocol overhead and data field data are divided in block 84 into fragments which are 1200 symbols long as represented in FIG. 3. Block 84 then inserts a test word 40 in between each pair of adjacent fragments as is also represented in FIG. 3. The test words 40 are of the format represented in FIG. 4 as discussed above. In this particular embodiment, a predefined test word is stored in block 86 which is connected to block 84. The same predefined test word stored in block 86 is used as each of the test words 40. The particular test pattern in each of the respective ANT fields for each test word 40 is identical. Therefore, when the packet 30 is received each of the diversity antennas in the receiving device attempt to receive the same identical test pattern within the test word 40. The antenna exhibiting the best reception quality in receiving the test pattern is then selected to receive the next fragment in the packet 30.

The block 84 provides the protocol overhead and data field data, with the test words 40 inserted therein, to block 88. The block 88 proceeds to attach an appropriate synchronization field 32 and delimiter field 34 at the beginning of the data provided by block 84 so as to complete the packet 30. The packet 30 is then delivered to an RF modulator block 90 which modulates the packet 30 onto a carrier signal using known techniques. The modulated carrier is then provided to a transmitter block 92 within the RF transmitter 62. The transmitter block 92 performs appropriate amplification and filtering as is conventional, and provides the RF output to the antenna switch 64. The processor 52 provides a control signal to the antenna switch 64 selecting a transmit mode and a particular one of the antennas, and the packet 30 is transmitted to the receiving device.

The utility of the present invention is particularly apparent when the radio 50 is receiving a packet 30. Whenever the radio 50 is not transmitting a packet 30 the processor 52 causes the antenna switch 64 to be in a receiving mode with one of the antennas ANT1–ANTn selected to provide the received signal. For sake of example, it is assumed that the radio 50 automatically uses ANT1 as its default antenna to receive signals until the antenna diversity scheme results in another antenna being selected.

The receiver 66 includes a receiver block 96 to which the received RF signal from the selected antenna is input. The receiver block 96 filters and processes the received signal including the packet 30 according to conventional techniques and provides the signal to a demodulator block 98. The demodulator block 98 demodulates the received signal using the demodulation scheme corresponding to that of the modulator 90, and outputs the packet 30 having the format shown in FIG. 3. The packet 30 is input to a correlate and process block 100 substantially in real time as it is received. The block 100 includes means for synchronizing to the packet 30 based on the synchronizing field 32 as is conventional. In addition, the block 100 uses conventional techniques to identify the start frame delimiter 34. Based on the start frame delimiter 34, the block 100 identifies the point 36 at the beginning of the first symbol in the first fragment "Fragment 1" included in the packet 30. Furthermore, at the time represented by point 36 the block 100 provides an enable signal on line 102 to an accumulator 104 which serves to count the number of consecutive symbols which have been received since the beginning of the first fragment (i.e., since point 36).

Since the length of each fragment is predefined (with the exception perhaps of the last fragment in a packet 30) and the length of each of the respective portions of the test words 40 are known, the accumulator 104 can be configured to maintain a running count of the number of symbols (or bits) which have been received since the synchronized beginning of the packet 30 at point 36. In this manner, the accumulator 104 is capable of knowing exactly where in the packet 30 the receiving radio 50 is with respect to processing the incoming packet. The accumulator 104 interfaces with a phase lock loop 105 connected to the output of the receiver 96 which allows it to lock onto the symbol (or data) rate of the incoming signal. During the periods of the switching fields 44 within the packet when the radio 50 switches diversity antennas, the accumulator 104 is able to remain in synchronization by anticipating the known number of symbols (or data bits) in the switching fields 44.

Thus, the accumulator 104 may be configured to output an enable signal on line 106 which is active only during each ANT field containing a test pattern in the test words 40. When the signal on line 106 is active, the correlate and process block 100 evaluates the degree of correlation between the test pattern for the corresponding antenna as actually received within the packet 30, and the predefined test pattern which should have been received. Specifically, block 108 is connected to block 100 and includes the predefined test word which is known to be added at each test word 40 by the device transmitting the packet 30 (e.g., the test word stored in block 86).

For a given test pattern in an ANT field included in a test word 40, the block 100 outputs a correlation value on line 110 indicative of the degree of correlation between the received test pattern and the actual test pattern. The correlation value on line 110 is input to a best antenna selector block 112 which temporarily stores the value. In addition, the best antenna selector block 112 receives a control signal on line 114 which is indicative of the particular antenna ANT1 through ANTn used to receive the test pattern resulting in the correlation value on line 110. The best antenna selector block 112 receives this information together with the correlation value. Alternative methods to using correlation to measure signal quality, such as spectral analysis, error bit detection, etc., could also be used.

The accumulator 104 also provides an output on line 116 which is used to increment a diversity state machine 117 for switching from one diversity antenna to another. More particularly, the output on line 116 goes active temporarily at the beginning of each switching field 44 following a test pattern in an ANT field. This prompts the diversity state machine 117 to select the next diversity antenna according to a predefined sequence for receiving the next test pattern in the following ANT field. The diversity state machine 117 provides at its output a control signal to the antenna switch 64 for selecting the particular antenna ANT1 through ANTn which is to be used for receiving the next test pattern within a test word 40. The correlate and process block 100 thus determines the degree of correlation between the received test pattern and the actual test pattern with respect to each of the different diversity antennas for a given test word 40.

After a corresponding test pattern has been evaluated by each diversity antenna in a given test word 40, the accumulator 104 outputs a control signal on line 118 instructing the best antenna selector 112 to select the "best" antenna. Such control signal coincides with the beginning of the last switching field 44 included in the given test word 40. Upon receipt of the control signal on line 118, the best antenna selector 112 identifies the particular diversity antenna ANT1 through ANTn which provided the highest degree of correlation with the test pattern in the given test word 40. Then, during the final switching field 44 the best antenna selector 112 instructs the diversity state machine via line 120 to select the identified "best" antenna. The selected antenna is then utilized to receive the particular fragment of the packet 30 which immediately follows the test word 40.

The accumulator 104 also provides an output on line 122 which identifies the beginning and the end of each test word 40 included in the received packet 30. The output on line 122 is provided to a word destuffing block 124 which operates to remove, mask, or otherwise strip away each test word 40 from the received packet 30. Thus, the output of the word destuffing block 124 consists of the packet 30 without the test words 40 interposed between the fragments. The packet 30 is then input to a channel decoder block 126 which performs symbol-to-data conversion according to conventional techniques in order to obtain the packet data in bit format as represented in block 128. The processor 52 then processes the packet data in whatever manner is appropriate depending on the particular application of the radio 50.

Accordingly, the embodiment of FIG. 6 allows a packet 30 to be transmitted or received with test words 40 included therein for facilitating selection of an antenna according to a diversity antenna scheme. Unlike conventional devices, there is no need to transmit each fragment of a packet with its own preamble. The entire packet 30 is transmitted and received as a whole. The accumulator 104 maintains synchronization with the packet 30 being received even as the radio 50 switches between different diversity antennas. Therefore, relatively high data throughput rates can be maintained while still providing the advantages of antenna diversity.

FIG. 7 illustrates another embodiment of the present invention. In this particular embodiment the radio, designated 50', employs direct sequence spread spectrum (DSSS) digital communication techniques. Specifically, each data bit (or symbol) within a packet 30 is encoded using a pseudo-random sequence (referred to commonly as a PN code). Most of the components and/or functional blocks shown in the embodiment of FIG. 7 are the same as those shown in the embodiment of FIG. 6. As a result, only the significant differences between the embodiments will be discussed herein for sake of brevity.

In the embodiment of FIG. 6 each test word 40 includes the same predefined test pattern in the respective ANT fields which is then evaluated by each of the respective diversity antennas. The embodiment of FIG. 7 differs in that rather than utilizing a somewhat arbitrary test pattern, each test word 40 includes a test pattern in each ANT field which is actually the CRC value for the fragment immediately preceding the test word 40. The benefit of using the CRC value is that each CRC value is generally unique to its data fragment. Thus, not only can the CRC value be used to determine which antenna is best suited for receiving the next fragment of the packet, but also can be utilized for error detection. As is described more fully below in connection with FIG. 8, the acknowledgment sent back from a receiving device to a transmitting device can indicate which fragments were not properly received so that only those fragments are required to be retransmitted. It is noted that in this embodiment the packet 30 need not include an error detecting field 26 at the end of the packet 30. The individual CRC values for the different fragments serve the same purpose.

As shown in FIG. 7, the block 80 outputs the digital data for the data field 24 and the protocol overhead data (field 38) which represents the information to be transmitted in a packet. The data field data and protocol overhead data are input both to the word stuffing block 84 and to a CRC determining section 130. The CRC determining section 130 determines the CRC value for each fragment immediately preceding a test word 40 which is inserted by the word stuffing block 84 at predefined intervals as discussed above. The word stuffing block 84 receives the CRC values from the CRC determining section 130 and inserts a test word 40 following each fragment of the protocol overhead and data field data. Each particular test word 40 includes ANT fields $ANT_{current}$ through $ANT_n$, with each ANT field including a test pattern made up of the CRC value for the immediately preceding fragment as provided by the CRC determining section 130. Subsequent to inserting the test words 40, the data is converted to symbols by the channel encoder 82 and forwarded to block 88 where the synchronization field 32 and delimiter field 34 are added. Thereafter, the completed packet 30 is forwarded to the transmitter 62 where it is transmitted to a receiving device.

As previously mentioned, the radio 50' in the embodiment of FIG. 7 uses DSSS techniques to transmit and receive information. Packets 40 which are received by the radio 50' are forwarded from the demodulator 98 to a PN correlator and processing block 100'. The block 100' is identical in function to block 100 in the embodiment of FIG. 6, with the following exception. Rather than determining the degree of correlation between a predefined test pattern and the test pattern received in the test word 40 for each diversity antenna as in FIG. 6, block 100' determines the ability of the radio 50' to correlate with the known PN coding of the incoming test patterns (each comprising the CRC value ) included in the test words 40. The better able the radio 50' is to correlate to the PN coding of the incoming packet during the test words indicates the reception quality of the respective diversity antennas ANT1–ANTn.

As in the previous embodiment, the accumulator 104 provides the appropriate timing signals to the correlate and process block 100', the word destuffing block 124, the diversity state machine 117, and the best antenna selector 112. In the embodiment of FIG. 7, the PN correlate and process block 100' provides an indication on line 110 of the degree of correlation between the incoming packet 30 during a given ANT field for the selected diversity antenna. The diversity state machine 117 selects the antenna exhibiting the best correlation similar to the previous embodiment, such that the fragment immediately following the test word 40 is received by the best suited antenna.

The packet 30 is output from the PN correlate and process block 100' to the channel decoder 126 which performs symbol-to-data conversion as is conventional. The packet 30 is then input to the word destuffing block 124 which is controlled by the accumulator 104 via line 122. As in the previous embodiment of FIG. 6, the control signal on line 122 causes the word destuffer block 124 to remove the test words 40 from the packet 30 so as to leave remaining the original protocol overhead and data field data as represented by block 128.

The radio 50' in the embodiment of FIG. 7 also includes a CRC determining section 132 at the output of the word destuffing block 124. The CRC determining section 132 determines the CRC value of each fragment immediately preceding a test word 40 included in the received packet 30. In the event the fragment is received error free, the CRC value computed in the CRC determining section 132 should be identical to the CRC value included in the corresponding test word 40 for the antenna ANT1–ANTn used to receive the particular fragment. Thus, the CRC determining section 132 provides the particular CRC value computed for a corresponding fragment in the packet 30 to an input of a comparator 134. In addition, the word destuffing block 124 provides to the comparator 134 the CRC value as obtained from the test word 40 during the diversity testing as received by the particular antenna ANT1-ANTn used to receive the corresponding fragment. Although not shown, the accumulator 104 may provide the appropriate timing control to the CRC determining section 132, the word destuffing block 124, and the comparator 134.

In such manner, the comparator 134 compares the CRC value which is calculated by the CRC determining section 132 for each fragment in the packet 30 with the CRC value received within the corresponding test word 40. If the two CRC values input to the comparator 134 are equal, this indicates that the respective fragment of the packet 30 has been received error free. If the two CRC values are different, this indicates that the respective fragment includes errors. The output of the comparator 134 is provided to a fragment log 136. As discussed below in relation to FIG. 8, the fragment log 136 is utilized to keep track of which fragments in a packet 30 were received error free and which fragments included errors. Thus, when transmitting an acknowledgment to a transmitting device, the radio 50' may indicate the particular fragments which were received with errors as identified in the log 136. The transmitting device then need only retransmit those fragments of the packet 30 which were received with errors. The transmitting device need not retransmit the entire packet 30.

Figure 8:
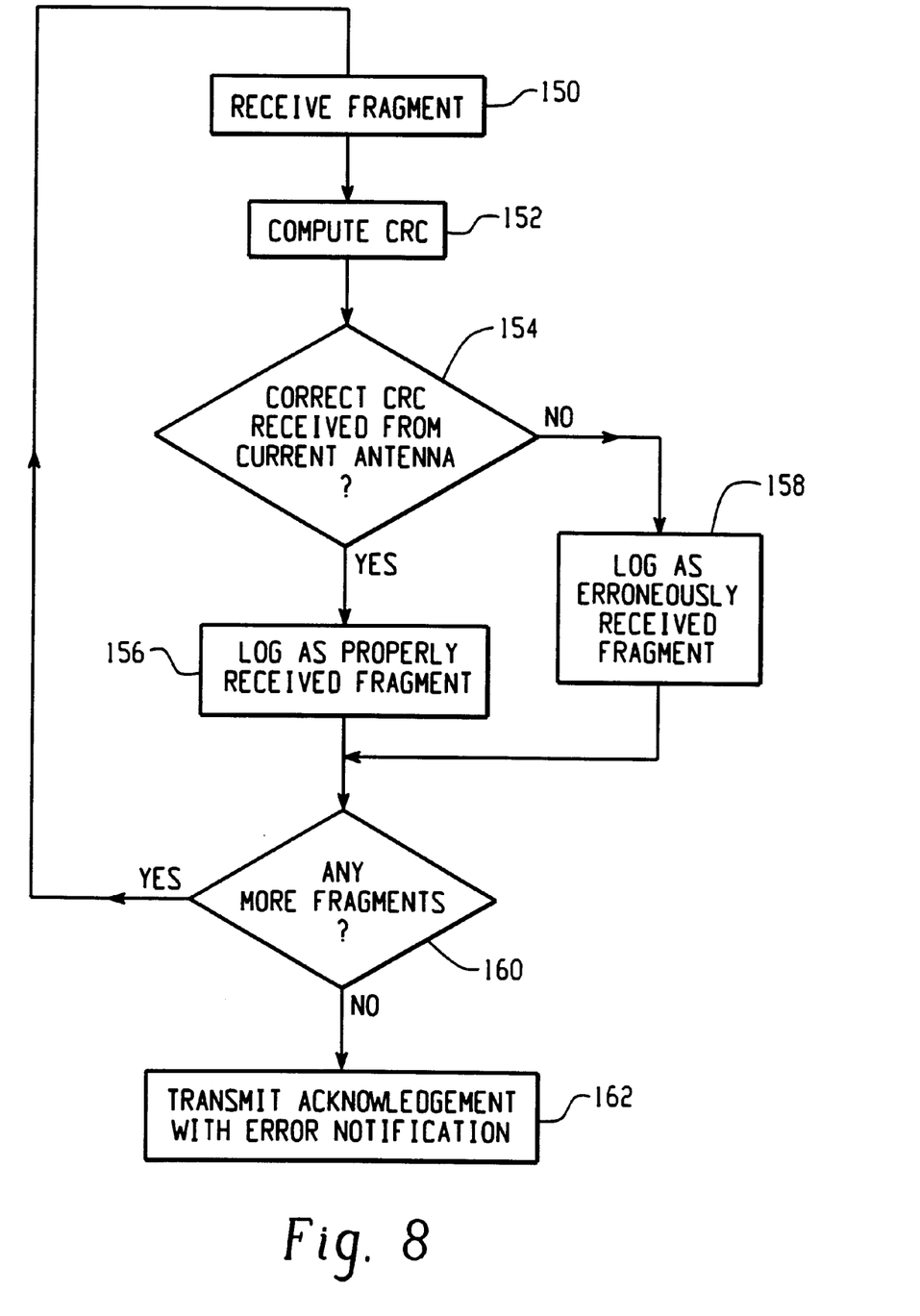
FIG. 8 is a flow chart showing the manner in which verification of fragments is carried out in accordance with the present invention.

For example, FIG. 8 illustrates the manner in which the radio 50' may maintain the log in block 136 of FIG. 7. In step 150, the radio 50' receives a fragment of an incoming packet 30. In step 152, the CRC determining section 132 determines the CRC value of the fragment. Next, in step 154 the comparator 134 determines if the CRC value computed by the CRC determining section 132 matches the CRC value for the fragment as received in the test pattern of the corresponding test word 40. If yes, the fragment log block 136 in step 156 logs that the particular fragment (e.g., fragment 1) was received without errors. If the CRC values from the CRC determining section 132 and the word destuffing block 124 are different, on the other hand, the fragment is considered to have been received in error and the radio 50' proceeds from step 154 to step 158. In step 158, the fragment log 136 logs the particular fragment as having been received with errors.

Following steps 156 and 158, the radio 50' proceeds to step 160 in which it determines if any more fragments from the packet 30 are being received. If yes, the radio 50' returns to step 150 and the above-described process is repeated for the next fragment. If not, the radio 50' proceeds to step 162. In step 162, the radio 50' generates and transmits and acknowledgment to the device originally transmitting the packet. The acknowledgment is conventional with the exception that the acknowledgment includes an indication of the specific fragments in the packet 30 which were received with errors. Such information is based on the information stored by the fragment log 136. The transmitting device is then able to retransmit the particular fragments which previously included errors. Although the present embodiment describes the radio 50' encoding packets using DSSS technology, it will be appreciated that a radio 50' employing frequency hopping would also be very well suited for use with the CRC value being included as the test word 40. Since the CRC contains several bits, the frequency hopping radio could use this beneficially to select the best antenna, as opposed to a DS radio which typically would require fewer bits in the test word since each bit is PN coded and antenna selection could occur at the chip level.

FIG. 9 represents another embodiment of the present invention which combines use of the test words 40 with adaptive filtering techniques. As is known, adaptive filters can be used within a radio to adjust for channel distortion. The fundamental premise behind the adaptive filter is that after receiving a predefined pattern of data, the adaptive filter can be adjusted to correct for any distortion encountered in receiving the predefined pattern of data. Conventional radios place a predefined data pattern in the preamble of the packet and adjust the adaptive filter accordingly. In the present invention, however, such a predefined data pattern is included in the test pattern for each ANT field in each test word 40 together with the CRC value. The predefined data pattern is used both for adjusting the adaptive filter and for evaluating the reception quality of each diversity antenna as described more fully below. It is noted that many of the blocks shown in the embodiment of FIG. 9 are identical to those in the embodiment of FIG. 7, and hence only the significant distinctions will be discussed herein.

In the embodiment of FIG. 9, the radio 50" may utilize communication techniques other than DSSS. For example, the radio 50" may use frequency hopping (FH) spread spectrum techniques. With regard to data packets 30 which are to be transmitted by the radio 50", the CRC determining section 130 as in the previous embodiment determines the CRC value of the data provided from block 80. In addition, however, the radio 50" includes an adaptive filter pattern block 170 which has stored therein a predetermined data pattern for use with an adaptive filter in the receiving device. The predetermined data pattern from the adaptive filter pattern block 170 is provided to the word stuffing block 84 as is shown. The word stuffing block 84 inserts the test words 40 at predetermined intervals into the packet 30 to be transmitted as previously described. In this particular embodiment, however, each test pattern included in an ANT field of a given test word 40 comprises the predetermined data pattern as provided from block 170 and the CRC value for the corresponding fragment as determined by block 130.

In the embodiment of FIG. 9, packets 30 which are received by the receiver block 96 are input to an adaptive filter 172 included in the receiver 66. The adaptive filter 172 filters the packet 30 according to its current filtering parameters and outputs the filtered signal to the demodulator 98. The packet 30 then proceeds to the processor block 100" which performs the above-mentioned processing on the filtered signal (with the exception of correlation testing) prior to the packet 30 being converted from symbol to data format by the channel encoder 126. The word destuffing block 124 in this embodiment again functions to remove the test words 40 from the packet 30. In addition, the word destuffing block 124 provides the CRC value from the test pattern corresponding to the antenna which received the immediately preceding fragment to the comparator 134 as in the previous embodiment.

Also, however, the word destuffing block 124 outputs the predetermined data pattern as received by each of the respective diversity antennas in their corresponding ANT field of the test word 40. Each predetermined data pattern is provided to a correlator 174 which attempts to correlate the predetermined data pattern as received with the predetermined data pattern provided by an adaptive filter pattern block 176. The adaptive filter pattern block 176 outputs to the correlator 174 the predetermined data pattern known to be inserted by the transmitting device in the test words 40 of the packet 30. The degree of correlation between the predetermined data pattern as received and the known data pattern is output by the correlator 174 onto line 178 and is provided to the best antenna selector 112. In this manner, the best antenna selector 112 receives from the correlator 174 the degree of correlation between the received predetermined data pattern and the known data pattern for each antenna ANT1 through ANTn during each test word 40 analogous to the examples provided above. The best antenna selector 112 then selects the antenna exhibiting the highest degree of correlation and provides the information to the diversity state machine 117 as shown. The diversity state machine 117 then proceeds to select the "best" antenna exhibiting the highest correlation for use in receiving the next fragment immediately following the test word 40.

Similar to the embodiment described above in relation to FIG. 7, the radio 50" includes a CRC determining section 132, a comparator 134, and a fragment log 136 for identifying those fragments which need to be retransmitted due to errors as discussed above. In addition, the radio 50" includes a register 180 which stores the predetermined data pattern from the test word 40 as received by the antenna ANT1–ANTn which actually received the immediately preceding fragment of the packet 30. The predetermined data pattern as stored in the register 180 is input to a digital comparator 182 which compares the predetermined data pattern as received with the known pattern as provided by the adaptive filter pattern block 176. The difference between the two is then fed back as an error signal to the adaptive filter 172. The adaptive filter 172 can then adjust its filtering parameters based on the error signal using conventional techniques.

Accordingly, the adaptive filter 172 in accordance with the present invention can be updated multiple times within the same packet 30. This is a significant advantage over conventional techniques in which the adaptive filter was adjusted only once in response to the preamble of the packet.

Although the invention has been shown and described with respect to certain preferred embodiments, it is obvious that equivalents and modifications will occur to others skilled in the art upon the reading and understanding of the specification. For example, the present invention is described in the context of wireless RF communications. It will be appreciated, however, that the present invention can be used with other wireless communication mediums such as optical, infra-red, etc. In addition, the present invention can be used with hardwired communications as well.

Furthermore, the test words 40 are described as including switching fields 44 for allotting for time for the state diversity machine 117 to switch from one diversity antenna to another. Another embodiment may do without such switching fields and instead simply disregard the portion of the test word which is received during such time as the antennas are being switched. Also, many of the components described in the various embodiments of FIGS. 6, 7 and 9 may be implemented through digital logic circuitry in order to increase processing speed as well as switching speed between antennas.

In addition, the test words 40 discussed herein are utilized in the preferred embodiment to evaluate different receiving parameters in the form of different receiving antennas. It will be appreciated, however, that parameters other than the integrity of a signal received using different antennas can be evaluated. For example, the test words may serve as an opportunity to compare different data transmission rates, transmit power, coding schemes, etc. The integrity of the received signal under the different parameters can also be evaluated.

The present invention includes all such equivalents and modifications, and is limited only by the scope of the following claims.

What is claimed is:

1. A method for wirelessly communicating a packet of digital information including at least a preamble with a synchronization pattern, and a data field, the method comprising the steps of:

inserting at least a plurality of test words at different respective locations in the data field, the test forming a plurality of data field fragments;

transmitting wirelessly the packet as a whole including the test words from a transmitting device to a receiving device, the receiving device including a plurality of antennas, wherein each of said plurality of antennas is associated with one or more receiving parameters;

receiving the packet with the receiving device, in accordance with one or more of said plurality of antennas;

evaluating at least one of the plurality of test words in the received packet based on a comparison with a predefined criteria;

analyzing data reception properties associated with receiving the packet based on the evaluating step;

selecting one of said plurality of antennas for respective reception of each of said fragments, based on the analyzed data reception properties;

receiving with the selected antenna until another antenna is selected exhibiting highest reception quality; and at least one of: altering at least one of said receiving parameters, and requesting retransmission of selected fragments.

2. The method of claim 1, wherein the inserting step comprises the step of dividing the data field into the fragments and inserting a respective one of the plurality of test words between different pairs of fragments.

3. The method of claim 2, wherein each test word comprises a test pattern.

4. The method of claim 2, wherein each test word comprises a plurality of test patterns.

5. The method of claim 4, wherein the evaluating step includes a step of comparing the integrity of the test patterns as received by the receiving device under different respective receiving parameters.

6. The method of claim 5, wherein the different receiving parameters are based on use of different antennas to receive the packet from the transmitting device.

7. The method of claim 6, further comprising a step of selecting one of the different antennas for use in receiving a fragment following the test word based on the integrity comparing step.

8. The method of claim 2, wherein each test word comprises a cyclical redundancy code (CRC) value corresponding to a fragment preceding the test word.

9. The method of claim 8, further comprising a step of determining a CRC value for the fragment preceding the test word and comparing the determined CRC value with the CRC value included in the test word in order to identify errors in the fragment preceding the test word.

10. The method of claim 1, wherein each test word comprises a plurality of test patterns separated by at least one switching bit during which the receiving device alters its receiving parameters in preparation for receiving a test pattern following the at least one switching bit.

11. The method of claim 1, wherein the receiving step comprises a step of filtering the received packet based on adaptive filtering techniques, and further comprising a step of altering the filter parameters based on a result of the evaluating step wherein the at least one test word evaluated includes a predefined pattern for altering the filter parameters.

12. A system for wirelessly communicating a packet of digital information including at least a preamble with a synchronization pattern, and a data field, the system comprising:

a channel encoder for inserting at least a plurality of test words at different respective locations in the data field, the test words forming a plurality of data field fragments;

a transmitter for wirelessly transmitting the packet as a whole including the test words from a transmitting device to a receiving device;

a receiver for receiving the packet with the receiving device, the receiving device including a plurality of antennas, wherein each of said plurality of antennas is associated with one or more receiving parameters;

a correlate and process block for evaluating at least one of the plurality of test words in the received packet based on a comparison with a predefined criteria, wherein the correlate and process block analyses data reception properties associated with receiving the packet based on the performed evaluation;

an antenna selector for selecting one of said plurality of antennas for respective reception of each of said fragments, based on the analyzed data reception properties wherein the antenna selector causes the selected antenna to receive until another antenna is selected exhibiting highest reception quality; and an arrangement for at least one of: altering at least one of said receiving parameters, and requesting retransmission of selected fragments.

13. The system of claim 12, wherein the channel eroder for inserting divides the data field into the fragments and inserts a respective one of the plurality of test words between different pairs of fragments.

14. The system of claim 13, wherein each test word comprises a test pattern.

15. The system of claim 13, wherein each test word comprises a plurality of test patterns.

16. The system of claim 15, wherein the correlate and process block for evaluating compares the integrity of the test patterns as received by the receiving device under different respective receiving parameters.

17. The system of claim 16, wherein the different receiving parameters are based on use of different antennas to receive the packet from the transmitting device.

18. The system of claim 17, further antenna selector for selecting one of the different antennas for use in receiving a fragment following the test word based on the integrity of the test patterns as compared by the means for evaluating.

19. A system for communicating a packet of digital information including at least a preamble with a synchronization pattern and a data field, the system comprising:

a transmitting device for transmitting the packet via a radio frequency (RF) signal, the transmitting device including:

means for dividing the packet into a plurality of fragments and including test words in between consecutive fragments; and a transmitter for transmitting the packet as a whole including the test words via the RF signal; and a receiving device for receiving the packet from the transmitting device, the receiving device including:

a receiver for receiving the packet via the RF signal;

a plurality of receiving antennas;

a switch for determining which of the plurality of antennas provides the RF signal to an input of the receiver;

a control circuit operatively connected to the switch for causing each of the plurality of antennas to be used in receiving at least a corresponding portion of each test word;

an evaluation circuit for evaluating reception quality of the receiver using each of the plurality of antennas based on receiving the corresponding portion of each test word; and a selection circuit, governed by the evaluation circuit, for selecting one of the plurality of antennas to provide the RF signal to the input of the receiver during a portion of the packet subsequent to each test word, said selection circuit determining the state of the switch of the receiving device such that the selected antenna receives until another antenna is selected exhibiting highest reception quality.

20. The system of claim 19, wherein the evaluation circuit evaluates the reception quality based on a degree of correlation between a predefined test pattern included in the test word and a corresponding pattern actually received by the receiver using each of the plurality of antennas.

21. The system of claim 19, wherein the evaluation circuit evaluates the reception quality based on an ability of the receiver to correlate to each of the corresponding portions of each test word.

22. The system of claim 19, wherein each test word comprises a cyclical redundancy code (CRC) value corresponding to a fragment immediately preceding the test word, the evaluation circuit further using the CRC value to evaluate reception quality.

23. The system of claim 19, further comprising an adaptive filter for filtering the packet as it is received by the receiver, and wherein the test word comprises a predefined pattern for altering a filter parameter of the adaptive filter.

24. A method of communicating a packet of information in a wireless communication system, comprising the steps of:
    inserting a test word in a data field of the packet to be transmitted wirelessly, the test word defining a boundary between a first fragment of data in the data field and a second fragment of data in the data field;
    transmitting the packet from a transmitting device;
    receiving the packet with a receiving device having a plurality of receiving antennas for receiving data;
    evaluating, during receipt of the packet, the test word in the data field of the packet;
    selecting, based on the evaluation, one of the plurality of antennas;
    switching to another antenna exhibiting highest reception quality; and
    utilizing, during receipt of at least the second fragment of data, the selected antenna of the plurality of receiving antennas.

25. The method of claim 24, wherein the evaluating step includes the steps of utilizing each of the plurality of antennas to receive at least a portion of the test word and recognizing errors in the reception of the test word.

26. The method of claim 25, wherein the recognizing step involves analyzing the ability to correlate to the test word.

27. The method of claim 1, further including the step of selecting one of the plurality of antennas to provide to the input receiver a data field fragment subsequent to the at least one evaluated test word.

28. The system of claim 12, further including means for selecting one of the plurality of antennas to provide to the input of the receiver a data field fragment subsequent to the at least one test word.

29. A method for wirelessly communicating a packet of digital information including (1) a plurality of data fragments with data fields, and (2) test words respectively associated with said data fragments, each said test word having a plurality of antenna fields with predefined test pattern data, wherein each antenna field is associated with an antenna in a receiving device, the method comprising the steps of:
    (a) wirelessly transmitting the packet as a whole from a transmitting device to a receiving device, the receiving device including a plurality of antennas for receiving the packet;
    (b) receiving the predefined test pattern data of each antenna field of a test word, wherein the predefined test pattern data of each antenna field is received with a different antenna of the receiving device;
    (c) evaluating one or more data reception properties associated with each of said plurality of antennas of the receiving device;
    (d) selecting one of said plurality of antennas of the receiving device for receiving the data fragment associated with the test word, in accordance with the evaluated data reception properties;
    (e) receiving the data fragment associated with the test word using the selected antenna of the receiving device;
    (f) repeating steps (b) through (e) for each data fragment of the packet; and
    (g) switching to another antenna exhibiting highest reception quality.

30. A method according to claim 29, wherein the predefined test pattern data is the same for each antenna field.

31. A method according to claim 29, wherein the predefined test pattern data is a cyclical redundancy code (CRC) value for the respectively associated data fragment.

32. A method according to claim 29, wherein said one or more data reception properties include reception quality in receiving the predefined test pattern data.

33. A method according to claim 29, wherein said one or more data reception properties include at least one of data transmission rate, transmission power, and coding scheme.

34. A system for wirelessly communicating a packet of digital information including (1) a plurality of data fragments with data fields, and (2) test words respectively associated with said data fragments, each said test word having a plurality of antenna fields with predefined test pattern data, wherein each antenna field is associated with an antenna in a receiving device, the system comprising:
    (a) transmitting means for wirelessly transmitting the packet as a whole from a transmitting device to a receiving device, the receiving device including a plurality of antennas for receiving the packet;
    (b) receiving means for receiving the predefined test pattern data of each antenna field of a test word, wherein the predefined test pattern data of each antenna field is received with a different antenna of the receiving device;
    (c) evaluation means for evaluating one or more data reception properties associated with each of said plurality of antennas of the receiving device;
    (d) selection means for selecting one of said plurality of antennas of the receiving device for receiving the data fragment associated with the test word, in accordance with the evaluated data reception properties wherein the selection means causes the selected antenna to receive until another antenna is selected exhibiting highest reception quality; and
    (e) means for receiving the data fragment associated with the test word using the selected antenna of the receiving device.

35. A system according to claim 34, wherein the predefined test pattern data is the same for each antenna field.

36. A system according to claim 34, wherein the predefined test pattern data is a cyclical redundancy code (CRC) value for the respectively associated data fragment.

37. A system according to claim 34, wherein said one or more data reception properties include reception quality in receiving the predefined test pattern data.

38. A system according to claim 34, wherein said one or more data reception properties include at least one of data transmission rate, transmission power, and coding scheme.

39. A computer program product comprising:
    a computer usable medium having computer readable program code embodied therein for wirelessly communicating a packet of digital information including at least a preamble with a synchronization pattern, and a data field, the computer readable program code comprising:
- instructions for inserting at least a plurality of test words at different respective locations in the data field, the test forming a plurality of data field fragments;
- instructions for causing the packet as a whole to be wirelessly transmitted, including the test words, from a transmitting device to a receiving device, the receiving device including a plurality of antennas, wherein each of said plurality of antennas is associated with one or more receiving parameters;
- instructions for causing the packet to be received with the receiving device, in accordance with one or more of said plurality of antennas;
- instructions for evaluating at least one of the plurality of test words in the received packet based on a comparison with a predefined criteria;
- instructions for analyzing data reception properties associated with receiving the packet based on the evaluating step;
- instructions for selecting one of said plurality of antennas for respective reception of each of said fragments, based on the analyzed data reception properties;
- instructions for receiving with the selected antenna until another antenna is selected exhibiting highest reception quality; and
- instructions for at least one of: altering at least one of said receiving parameters, and requesting retransmission of selected fragments.

40. A receiver system for wireless communication comprising:
- a receiver for receiving with a receiving device including a plurality of antennas a packet of digital information including at least a preamble with a synchronization pattern, and a data field, wherein the packet is sent from a wireless transmitter, wherein each of said plurality of antennas is associated with one or more receiving parameters;
- a correlate and process block for evaluating at least one of a plurality of test words in the received packet based on a comparison with a predefined criteria, wherein the test words are inserted at different respective locations in the data field, the test words forming a plurality of data field fragments, wherein the correlate and process block analyzes data reception properties associated with receiving the packet based on the performed evaluation;
- an antenna selector for selecting one of said plurality of antennas for respective reception of each of said fragments, based on the analyzed data reception properties wherein the antenna selector causes the selected antenna to receive until another antenna is selected exhibiting highest reception quality; and
- an arrangement for at least one of: altering at least one of said receiving parameters, and requesting retransmission of selected fragments.

41. A method of wireless communication comprising:
- receiving a packet of digital information including at least a preamble with a synchronization pattern and a data field, wherein the step of receiving comprises receiving the packet with a plurality of antennas associated with one or more receiving parameters;
- evaluating at least one of a plurality of test words in the received packet based on a comparison with predefined criteria, wherein the test words are inserted at different respective locations in the data field, the test words forming a plurality of data field fragments;
- analyzing data reception properties associated with receiving the packet based on the step of evaluating;
- selecting one of a plurality of antennas for respective reception of each of said fragments, based on the analyzed data reception properties;
- causing the selected antenna to receive until another antenna is selected exhibiting highest reception quality; and
- at least one of: altering at least one of said receiving parameters, and requesting retransmission of selected fragments.

42. A receiver system for wireless communication comprising:
- means for receiving a packet of digital information including at least a preamble with a synchronization pattern and a data field, wherein the means for receiving comprises means for receiving the packet with a plurality of antennas associated with one or more receiving parameters;
- means for evaluating at least one of a plurality of test words in the received packet based on a comparison with predefined criteria, wherein the test words are inserted at different respective locations in the data field, the test words forming a plurality of data field fragments;
- means for analyzing data reception properties associated with receiving the packet based on the step of evaluating;
- means for selecting one of a plurality of antennas for respective reception of each of said fragments, based on the analyzed data reception properties;
- means for causing the selected antenna to receive until another antenna is selected exhibiting highest reception quality; and
- at least one of: means for altering at least one of said receiving parameters, and means for requesting retransmission of selected fragments.

43. A computer usable medium having computer readable program code embodied therein for causing wireless communication, the computer readable program code into a computer program product comprising:
- instructions for receiving a packet of digital information including at least a preamble with a synchronization pattern and a data field, wherein the instructions for receiving comprises instructions for receiving the packet with a plurality of antennas associated with one or more receiving parameters;
- instructions for evaluating at least one of a plurality of test words in the received packet based on a comparison with predefined criteria, wherein the test words are inserted at different respective locations in the data field, the test words forming a plurality of data field fragments;
- instructions for analyzing data reception properties associated with receiving the packet based on the step of evaluating;
- instructions for selecting one of a plurality of antennas for respective reception of each of said fragments, based on the analyzed data reception properties;
- instructions for causing the selected antenna to receive until another antenna is selected exhibiting highest reception quality; and
- at least one of: instructions for altering at least one of said receiving parameters, and instructions for requesting retransmission of selected fragments.

* * * * *